United States Patent [19]
Jackson

[11] Patent Number: 4,806,242
[45] Date of Patent: Feb. 21, 1989

[54] SELF-CLEANING FILTER

[75] Inventor: Philip Jackson, Paris, France

[73] Assignee: E. Beaudrey & Cie, Paris, France

[21] Appl. No.: 13,029

[22] Filed: Feb. 10, 1987

[30] Foreign Application Priority Data

Feb. 11, 1986 [FR] France ................ 86 01819

[51] Int. Cl.$^4$ ............................................. B01D 29/04
[52] U.S. Cl. ......................... 210/303; 210/305; 210/315; 210/338; 210/342; 210/422; 210/497.3; 210/499
[58] Field of Search ............... 210/303, 304, 305, 315, 210/316, 338, 342, 420, 422, 488, 497.01, 497.3, 499, 450, 447; 55/282, 482, 483

[56] References Cited

U.S. PATENT DOCUMENTS

| | | | |
|---|---|---|---|
| 3,794,179 | 2/1974 | Doucet | 210/409 |
| 4,565,631 | 1/1986 | Bitzer et al. | 210/333 |

FOREIGN PATENT DOCUMENTS

| | | |
|---|---|---|
| 3332511 | 3/1985 | Fed. Rep. of Germany . |
| 3413413 | 10/1985 | Fed. Rep. of Germany . |
| 2107102 | 5/1972 | France . |
| 2541134 | 8/1984 | France . |
| 541341 | 10/1973 | Switzerland . |
| 564638 | 7/1975 | Switzerland . |

OTHER PUBLICATIONS

"Selection Guide for Victaulie Gaskers", Rexdale, Ontario Canada, 1981, pp. 1-3.

Primary Examiner—Benoit Castel
Assistant Examiner—Richard D. Jordan
Attorney, Agent, or Firm—Charles E. Brown; Charles A. Brown

[57] ABSTRACT

A filter without moving parts comprises a filter body adapted to be fitted in the flow direction into a conduit conveying a fluid to be filtered. A filter screen has a frustoconical outer filter wall with at least part of its larger diameter end inside the filter body. A collection space inside the filter body surrounds the filter screen. At least one offtake conduit is connected to this collection space. An inner filter wall of the filter screen extends at least partly into the outer filter wall from its smaller diameter end. A back wall intersects the inner filter wall and a further collection space is delimited by the inner filter wall and this back wall at the end of this inner filter wall farthest removed from the smaller diameter end of the outer filter wall. A further, separate offtake conduit is connected to the further collection space and passes substantially radially through the inner filter wall and the outer filter wall of the filter screen.

19 Claims, 2 Drawing Sheets

SELF-CLEANING FILTER

BACKGROUND OF THE INVENTION

1. Field of the invention

The present invention is generally concerned with filters used to clean a fluid circulating in a network under pressure and likely to entrain debris, detritus or foreign bodies It is more particularly directed to treatment of industrial process water which may contain man-made debris or detritus or vegetables, such as algae, for example, or animals such as mussels, shellfish or fish liable to proliferate on the downstream side unless previously separated out.

2. Description of the prior art

Filters used to clean industrial process water usually comprise a filter body and, at least in part installed in the filter body, a screen, that is to say a filter element that may comprise a screen of perforated sheet metal or filter fabric, or a screen formed by an array of parallel blades or filaments carried by transverse support bars, the screen being designed to be inserted into the flow to be treated.

The present invention is more particularly directed to the case where, to obtain self-cleaning filters, means are provided for systematically evacuating debris, detritus and foreign bodies held back by the screen.

In some implementations a mechanical cleaning device is used for this purpose.

For example, where the screen simply comprises a filter element curved into a part-cylindrical shape there is disposed in its vicinity, and in practise in a counter-flow arrangement, that is to say on the upstream side relative to the corresponding flow, a suction device which is connected to the drain system and which is mounted to rotate about the axis of the screen.

Self-cleaning filters equipped in this way with a rotary cleaning device have numerous disadvantages.

First of all, they usually cause significant turbulence on the downstream side and therefore constitute a source of head losses there.

They are also relatively complex and, inevitably having regions where the velocity is very high, they are relatively vulnerable to erosion and corrosion.

Finally, and most importantly, as the rotary cleaning device fitted to them is disposed on the upstream side of the screen and therefore directly in the flow to be treated, they are subject to frequent malfunctions, the rotary cleaning device being jammed by debris, detritus or foreign bodies conveyed by the flow or already intercepted by the screen.

In currently known self-cleaning filters of this type any such jamming may damage or even break the cleaning device and/or the screen.

In other implementations, which have the advantage of using no moving parts for the most part, except for internal valves and/or flaps necessary for their operation, the direction of flow is systematically reverse at appropriate times in order to achieve the necessary elimination of debris, detritus and foreign bodies held back by the screen.

However, this implies the temporary removal from service of either the filter as a whole or at least one compartment of the filter, which is detrimental to the overall efficiency.

In other implementations which have the advantage of comprising no moving parts at all the required elimination of debris, detritus and foreign bodies held back by the screen is achieved very simply by structural design features which cause the incoming flow to sweep across the screen.

For example, in a first type of implementation of these self-cleaning filters without moving parts the arrangement is such that the speed vector of the incoming flow is oblique to the surface of the screen and thus has not only a component perpendicular to the latter, necessary to have the flow pass through the screen, but also a tangential component; by virtue of this latter component any debris, detritus and foreign bodies held back by the screen are systematically and continuously entrained.

In this first type of implementation of self-cleaning filters using no moving parts the filter body is in practise disposed around the screen in the manner of a spiral staircase, the flow to be treated entering the filter body tangentially and the treated flow leaving it axially.

Although giving satisfaction, the corresponding implementations are for the most part somewhat bulky and since they change the orientation of the flow to be treated, which also and inevitably results in head losses on the downstream side, they can be difficult to install, especially in existing installations, and so are not suitable for all applications.

In a second type of implementation of self-cleaning filters using no moving parts the filter body is adapted to be inserted in the flow direction in the conduit carrying the fluid to be cleaned, the filter screen then having a conical filter wall which has its larger diameter end at least partially fitted within the filter body, there being in the filter body and around the screen a volute-form collection space to which is connected an offtake conduit for evacuating debris, detritus and other foreign bodies held back by the screen.

However, in this second type of self-cleaning filter with no moving parts the screen is in practise cleaned only during periodic purges, the feed water for such purging then causing the incoming flow to rotate to bring about the necessary cleaning action; these periodic purges, which are diverted to the drainage system, inevitably mobilize large flowrates of water which is detrimental to a regular feed to the downstream installation.

Also, in the corresponding implementations it is currently necessary, to ensure an acceptable ratio between the filter surface area of the screen and the cross-section of the conduit into which it is inserted, for the length or height of the screen along the axis of the conduit to be considerable, in practise very much greater than twice the diameter of the conduit; once again this makes the possiblity of installing such filters very random, especially in existing installations, where there are rarely sufficient lengths of conduit between two bends available.

A general object of the present invention is an arrangement which, for a self-cleaning filter without moving parts adapted to be inserted in the flow direction into a conduit, has advantages including the fact that it advantageously makes it possible to minimize the overall length of the filter along the axis of the conduit whilst providing an acceptable ratio between the filter surface area and the cross-section of the conduit, and whilst also procuring at all points on the screen an angle of incidence relative to its surface of the speed vector of the flow to be treated adapted to procure systematic entrainment towards a collection space of debris, detritus or foreign bodies held back by the screen.

SUMMARY OF THE INVENTION

The present invention consists in a filter without moving parts comprising a filter body adapted to be fitted in the flow direction into a conduit conveying a fluid to be filtered, a filter screen having a frustoconical outer filter wall with at least part of its larger diameter end inside said filter body, a collection space inside said filter body and surrounding said filter screen, at least one offtake conduit connected to said collection space, an inner filter wall of said filter screen extending at least partly into said outer filter wall from the smaller diameter end thereof, a back wall intersecting said inner filter wall, a further collection space delimited by said inner filter wall and said back wall at the end of said inner filter wall farthest removed from said smaller diameter end of said outer filter wall, and a further, separate offtake conduit connected to said further collection space and passing substantially radially through said inner filter wall and said outer filter wall of said filter screen.

Thus the overall configuration of the screen of the filter in accordance with the invention is that of a finger of a glove the blind end of which has been pushed inside the main part.

As a result, it has a large filter surface area for a relatively small axial length or height.

This favors installation of the filter in accordance with the invention.

In practise, the overall axial dimension of the filter body, as measured between the flanges enabling it to be inserted into the conduit concerned, may advantageously be only very slightly greater than half the diameter of the conduit, or even less than this, and the length of the screen may advantageously be only very slightly greater than the diameter, although the filter surface area is at least five times greater than the cross-section of the conduit.

At the end of the inner filter wall of the screen furthest removed from the smaller diameter end of its outer filter wall, or in other words at the base of the screen, there is defined in accordance with the invention a collection space to which a separate offtake conduit is radially connected.

In other words, in the filter in accordance with the invention there are two searate collection spaces for the debris, detritus or foreign bodies held back by the screen, one at the center and the other at the edge.

Thus it is advantageously possible to reduce commensurately the purging flowrate needed for periodic removal of debris, detritus or foreign bodies, which favors a regular feed to the downstream installation.

Periodial purging operations can then be carried out alternately on the collection spaces so that, other things being equal, the flowrate is reduced by two thirds.

Because the speed vector of the flow to be treated is oblique both to the outer filter wall of the screen and to its inner filter wall, that is to say because this speed vector is at a low angle of incidence to the surface of these filter walls, and because of the surface turbulence that arises on passing through these walls, systematic entrainment towards the corresponding collection spaces of debris, detritus or foreign bodies held back by the filter walls is favored, so that the periodic purges to be carried out mainly serve to remove from these collection spaces the debris, detritus or foreign bodies previously collected in them, without it being necessary to develop simultaneously about these filter walls any rotation to bring such collection about.

Thus the flowrate used for the periodic purges is advantageously even further reduced.

Swiss Pat. No 564 638 describes a filter which in one embodiment comprises a screen formed by two conical filter walls disposed one inside the other with oppositely directed conical tapers.

However, a rotor is associated with the screen in the immediate vicinity of its conical filter walls on the downstream side thereof.

Apart from the fact that the corresponding filter thus does not constitute a filter without moving parts, as this term is to be understood in the context of the present invention, the presence of this rotor imposes an axial orientation for the offtake conduit associated with the central collection space which, in any event, matches the overall architecture of this filter and rules out simple insertion of the assembly into a conduit in the flow direction.

This is not the case with the filter in accordance with the invention, which is advantageous.

The characteristics and advantages of the invention will emerge from the following description given by way of example and with reference to the appended schematic drawings.

DESCRIPTION OF THE PREFERRED EMBODIMENT

Figure 1:
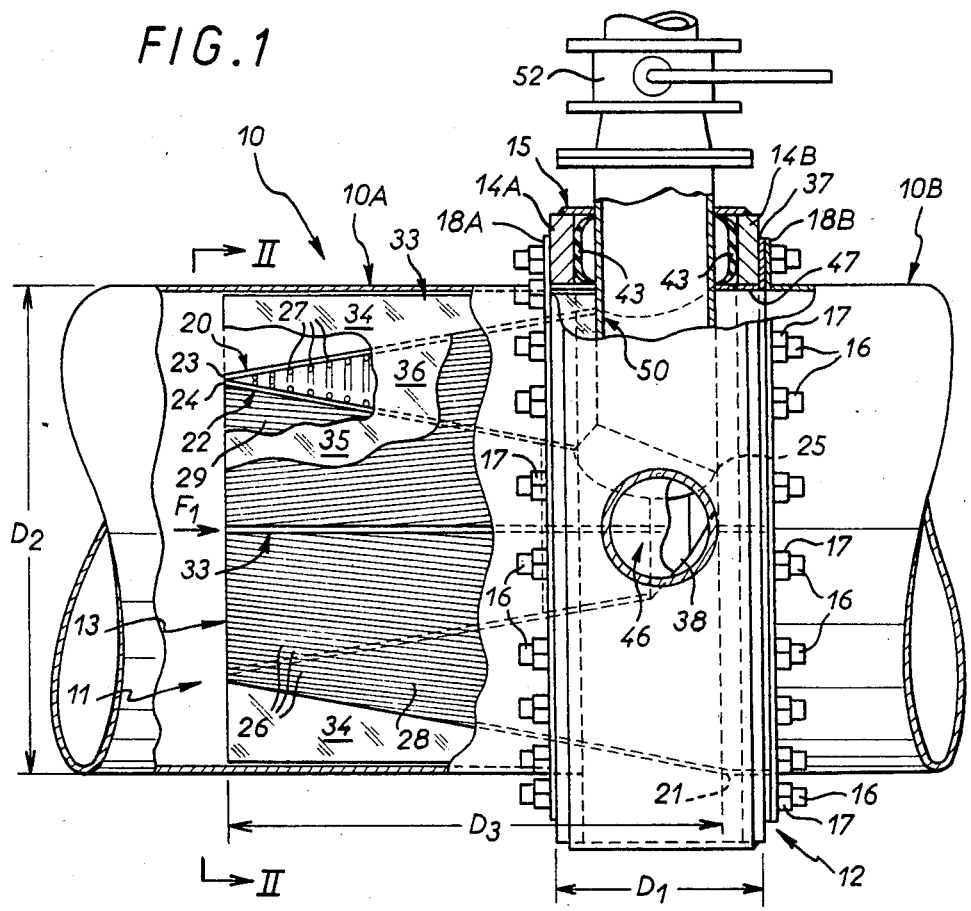
FIG. 1 is a locally cut away view in elevation and cross-section on the line II in FIG. 2 of the filter in accordance with the invention, shown fitted into a conduit.
Figure 5:
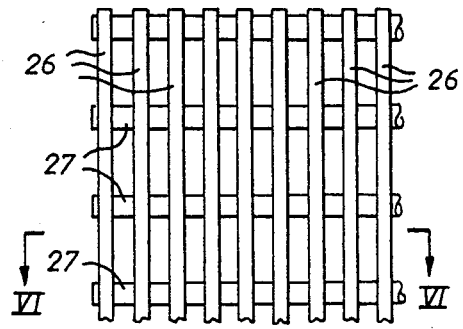
FIG. 5 is a partial plan view of a filter panel used in the construction of one or other of the filter walls that the screen of the filter in accordance with the invention comprises.
Figure 6:
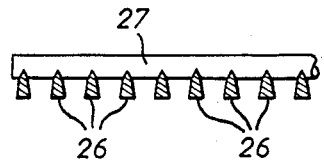
FIG. 6 is a view of this filter panel in transverse cross-section on the line VI—VI in FIG. 5.
Figure 2:
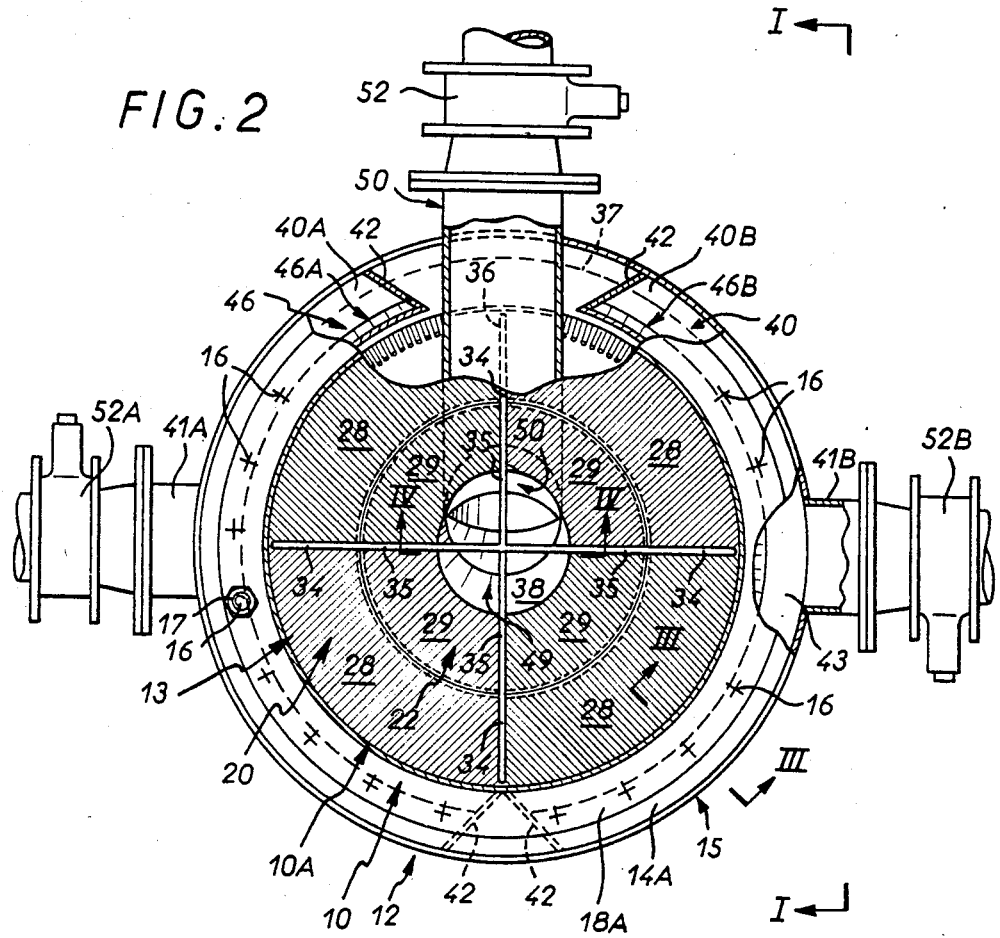
FIG. 2 is a view of the assembly in transverse cross-section on the line II—II in FIG. 1.

As shown in FIG. 1, the overall objective is to insert into a conduit 10 adapted to convey any fluid to be cleaned, in the direction of the arrow F1 in FIG. 1, a filter 11 adapted to separate out from the fluid flow any debris, detritus or foreign bodies entrained in it.

Taken as a whole the filter 11 used for this purpose comprises no moving parts; it is made up of a filter body 12 through which it is actually adapted to be inserted in the flow direction into the conduit 10 to be fitted with it, after temporarily demounting a section of this conduit, and a filter screen 13 at least partially inside the filter body 11, disposed generally along the axis of the assembly in the axial direction and disposed generally transversely in the conduit 10.

The filter body 12 comprises two spaced transverse walls 14A, 14B each comprising a simple flat plate and, extending axially between the transverse walls, 14A, 14B, a circular contour cylindrical side wall 15 attached to their outside edge.

As the method of implementing a filter body 12 of this kind is a matter of prior art, it will not be described in detail here.

However, it should be emphasized that the distance D1 between the transverse walls 14A, 14B of the filter body 12, as measured axially between their facing outside surfaces, may with advantage be only slightly half the diameter D2 of the conduit 10 to be fitted with the filter or even, as shown here, less than this.

The transverse walls 14A, 14B of the filter body 12 carry spaced axially projecting threaded rods 16 adapted for fixing the assembly by means of nuts 17 onto two butt-jointed sections 10A, 10B of the conduit 10, these conduit sections 10A, 10B being fitted with flanges 18A, 18B at their ends for this purpose.

It is to be understood that other fixing methods are eually feasible.

The filter screen 13 is of the kind comprising at least one conical filter wall.

In addition to a first filter wall 20, or outer filter wall, which is frustoconical with its larger diameter end 21 inside the filter body 12, the screen comprises a second filter wall 22, or inner filter wall, which extends at least part way into the inside of the space delimited by the outer filter wall from the smaller diameter end 23 of the outer filter wall 20.

The inner filter wall 22 extends over substantially all of the axial length of the outer filter wall 20 and is itself frustoconical.

The outer filter wall 20 projects out of the filter body 12 on the upstream side thereof by means of a central opening in the upstream transverse wall 14A of the filter body 12, its smaller diameter end 23 being axially spaced from the filter body 12 in the corresponding section 10A of the conduit 10. The inner filter wall 22 extends from a larger diameter end 24 at which, on the upstream side, it adjoins the smaller diameter end 23 of the outer filter wall 20, to which it is attached, to a smaller diameter end 25 which, in the transverse direction, is level with the larger diameter end 21 of the outer filter wall 20.

This larger diameter end 21 of the outer filter wall 20 is set back in the axial direction relative to the inside surface of the downstream transverse wall 14B of the filter body 12 and between it and the latter is an unapertured cylindrical wall 47 fastened to the outer filter wall 20 in abutting relationship with the inside edge of the transverse wall 14B.

The unapertured cylindrical wall 47 extends axially beyond the downstream transverse wall 14B of the filter body 12 and, outside the latter, it carries an annular flange 37 projecting radially away from the axis of the assembly which, to secure the screen 13 in place in the axial direction, is clamped axially between the transverse wall 14B of the filter body 12 and the flange 18B of the corresponding section of conduit 10B.

The overall arrangement is such that, given their cone angle and givn the portion of the flow to be treated that they intercept, the outer filter wall 20 and the inner filter wall 22 achieve substantially the same average flowrate of the fluid to be treated per unit surface area.

Because of this the cone angle of the inner filter wall 22, which intercepts the central portion of the flow to be treated, for example between ⅓ and ¼ of the whole flow, need not necessarily have the same cone angle as the outer filter wall 20, which intercepts the peripheral portion of the flow, for example between ⅔ and ¾ of the flow.

Nevertheless, in the embodiment shown the outer filter wall 20 and the inner filter wall 22 of the screen 13 have substantially the same cone angle.

For example, their half-angle at the apex may be in the order of 5° to 15°, and preferably in the vicinity of 10°.

However, it is to be understood that these values are given by way of non-limiting example only.

The length or axial height D3 of the screen 13 in accordance with the invention, as measured in the direction parallel to the axis of the conduit 10 between the larger diameter end 21 and the smaller diameter end 23 of this outer filter wall 20, is only slightly greater than the diameter D2 of the conduit 10.

As a result of what has been described previously, the filter surface area that the screen 13 presents as a whole is approximately five times greater than the useful cross-section of the conduit 10.

The outer filter wall 20 and inner filter wall 22 of the screen 13 each comprise panels, 28 in the case of the outer filter wall 20 and 29 in the case of the inner filter wall 22, each formed by an array of filaments 26 welded to transverse support bars 27.

The panels 28, 29 are cut out from the same filter fabric formed by a right-angle array of such filaments 26 and such transverse bars 27. In plan view the panels are in the shape of an isosceles trapezium with circular bases and are curved to the profile of the filter walls to be formed, being attached in pairs along generatrices which form their lateral edges.

They are cut out from the original filter fabric in such a way that their filaments 26 are parallel to their median generatrix.

Thus the filaments 26 lie in planes which are either radial planes or planes parallel to such radial planes in the case of the outer filter wall 20 and the inner filter wall 22.

In the usual way, the filaments 26 are profiled with a substantially triangular cross-section having a plane surface directed upstream and an apex directed downstream.

There are provided around at least part of the axial length of the screen 13, starting from the outer filter wall 20 thereof, baffles 34 which project radially away from the axis of the assembly as far as the immediate vicinity of the wall of the conduit section 10A.

There are four baffles 34 in a cruciform configuration extending over the full axial length of the outer filter wall 20 of the screen 13.

The space inside the inner filter wall 22 is subdivided into separate compartments by baffles 35 which extend axially over at least part of its axial length from its larger diameter end 24, in this instance over all of this length.

There are four baffles 35 in a cruciform configuration each aligned with a respective one of the previously mentioned baffles 34.

The space inside the screen 13 in accordance with the invention between the outer filter wall 20 and the inner filter wall 22 is subdivided into separate compartments by baffles 36 which extend axially over at least part of its axial length from the larger diameter end 21 of the outer filter wall 20, in this instance over all of this length.

There are four baffles 36 in a cruciform arrangement, each in line with a respective pair of the previously mentioned baffles 34, 35.

The various baffles 34, 35, 36 may be individually formed by metal plates appropriately cut out and fastened to the filter walls concerned, for example.

Their function is to guide the flow axially.

In the case of at least the baffles 35, 36, however, they also and advantageously serve to mechanically strengthen the assembly.

They may even serve to provide the framework of the screen 13, as here.

In this embodiment they all form parts of baffles 33 extending away from the axis of the assembly and between which are disposed the filter panels 28, 29 constituting the outer filter wall 20 and the inner filter wall 22 of the screen 13, which are welded to them.

There are four sheet metal baffles 33 extending in a cruciform configuration from the axis of the assembly to the vicinity of the wall of the conduit section 10A with, within each of the quadrants that pairs of the baffles form, a filter panel 28 and a filter panel 29, each of these panels extending over a quarter-circle.

The filter body 12 forms a collection space 40 around the screen 13.

The collection space 40 is circumferentially subdivided into two parts 40A, 40B each of which subtends an angle of slightly less than 180° and to each of which is connected a separate offtake conduit 41A, 41B.

Plates 42 delimit their ends.

These plates 42 are disposed obliquely to the corresponding annular surfaces and thus to the cylindrical lateral wall 15.

Each of the offtake conduits 41A, 41B is disposed substantially radially relative to the filter body 12, starting from the central region of the corresponding part 40A, 40B of the collection space 40.

They are disposed in diametrally opposed positions relative to each other and on each there is provided a quarter-turn type valve 52A, 52B for shutting it off.

Figure 3:
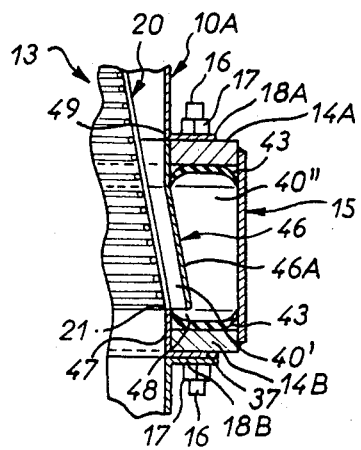
FIGS. 3 and 4 are partial views of the filter in accordance with the invention in axial cross-section on the respective lines III—III and IV—IV in FIG. 2.
Figure 4:
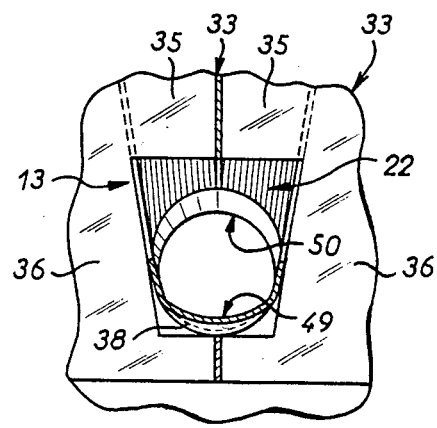

A frustoconical skirt 46 inside the filter body 12 surrounds the screen 13 at a distance from it and extends over part only of the axial length of the filter body 12 starting from the transverse wall 14A thereof axially nearer the smaller diameter end 23 of the outer filter wall 20 of the screen 13; this skirt subdivides the collection space 40 radially into two parts 40', 40", the former on the same side as the screen 13 and the latter on the same side as the cylindrical lateral wall 15 (FIG. 3).

Like the collection space 40, the frustoconical skirt 46 is circumferentially subdivided into two parts 46A, 46B each disposed inside the respective corresponding part 40A, 40B of the collection space 40 and extending between the end plates 42 of the latter.

Taken as a whole, the frustoconical skirt 46 extends cantilever fashion from a strap 49 by means of which it is welded to the inside edge of the transverse wall 14A of the filter body 12 and has its free end in substantial transverse alignment with the larger diameter end 21 of the outer filter wall 20 of the screen 13, and therefore substantially in line iith the end of the unapertured cylindrical wall 47 to which the outer filter wall 20 is connected.

The space 48 between this free end of the frustoconical skirt 46 and the facing transverse wall 14B of the filter body 12 enables the two parts 40', 40" of the collection space 40 to communicate.

The inside surface of the transverse wall 14B of the filter body 12 has a U-shaped radial profile.

The transverse wall 14B of the filter body 12 has a synthetic material lining 43 conferring the necessary profile.

It is to be understood that this lining 43 extends over only that part of the surface of the transverse wall 14B of the filter body 12 associated with the collection space 40; thus it is provided only in the two parts 40A, 40B constituting the latter.

The lining 43 is rounded off where it merges radially with the cylindrical lateral wall 15 of the filter body 12 and the unapertured cylindrical wall 47 inside the latter, merging substantially tangentially with the outer filter wall 20 of the screen 13 along the edge of the wall 47.

The inside surface of the other transverse wall of the filter body 12, meaning its transverse wall 14A axially nearest the smaller diameter end 23 of the outside filter wall 20 of the screen 13, is similarly profiled.

To this end the inside surface of this transverse wall 14A is also provided with a lining 43 of the same type as the aforementioned lining.

Such profiling of the transverse wall 14A is not indispensable, however.

The two linings 43 employed have their concave sides facing towards each other.

In addition to the collection space 40 there is at the end of the inner filter wall 22 of the screen 13 farthest away from the smaller diameter end 21 of the outer filter wall 20 of the latter, delimited by said inner filter wall 22 and a back wall 38 joining onto the corresponding end of the latter, a further collection space 49 to which is connected a separate offtake conduit 50 which passes substantially radially through the outer filter wall 20 and the inner filter wall 22 of the screen 13, substantially perpendicular to the previously mentioned offtake conduits 52A, 52B.

The offtake conduit 50 extends between the corresponding ends of the two parts 40A, 40B of the collection space 40, and thus intrrrupts the latter locally.

A cut-out for it to pass through is also provided in the corresponding baffle 33.

The offtake conduit 50 diverges towards its outlet into the collection space 49 that it serves and the back wall 38 delimiting the latter has a generally heel-shape profile in the direction towards this outlet.

In the embodiment as shown this back wall 38 is unapertured; as an alternative to this it could be a filter wall.

As previously, a quarter-turn type valve 52 is provided on the offtake conduit 50 for shutting it off.

During normal operation the valves 52, 52A and 52B are closed.

The central portion of the flow to be treated conveyed in the direction of the arrow F1 in FIG. 1 by the conduit 10 enters the inside of the screen 13 internally of the inner filter wall 22 in the axial direction.

This water strikes the inner filter wall 22 at a low angle of incidence corresponding to the cone angle of this wall, so that in addition to a normal penetration component its speed vector has a dominating tangential component relative to the inner filter wall 22.

Given that, as already mentioned, the filaments 26 from which the inner filter wall 22 are made extend in the same direction, the result of this tangential component of the speed vector of the water and of surface turbulence induced on passing through the inner filter wall 22 is that the debris, detritus or foreign bodies held back by the inner filter wall 22 are progressively entrained along the latter, being pushed along by the corresponding flow, the filaments 26 constituting the inner filter wall 22 being parallel to the flow lines.

Thus the debris, detritus or foreign bodies gradually collect in the collection space 49 that the inner filter wall 22 forms at its smaller diameter end 25.

By opening the valve 52 controling the corresponding offtake conduit 50 the collection space 49 is periodically purged, for example once every ten seconds or so.

Opening a valve 52 creates a significant influx of water which, diverted through the offtake conduit 50, passes through the screen 13 without passing through its inner filter wall 22.

The tangential component of the speed vector of the flow is commensurately increased and this increase, together with the increase in surface turbulence, results in stirring up and therefore detachment of any debris, detritus or foreign bodies that may have been held back by the inner filter wall 22, despite the entrainment process previously described.

Thus all the debris, detritus and foreign bodies held back by the inner filter wall 22 are evacuated to the drainage system.

The valve 52 concerned is then closed, and the inner filter wall 22 is then again subjected to the flow to be treated under normal conditions.

The peripheral portion of the flow to be treated entering the annular space between the outer filter wall 20 of the screen 13 and the section 10A of the conduit 10 also flows axially in the latter and thus the water concerned impinges on the outer filter wall 20 at a low angle of incidence corresponding to its cone angle so that, by virtue of the same process as previously, the filaments 26 constituting the outer filter wall 20 also extending along the flow lines, the debris, detritus or foreign bodies held back by the outer filter wall 20 are gradually pushed along it by the flow until they also reach the collection space 40 or, to be more precise, the corresponding part 40A or 40B of the latter.

It will be readily understood that the frustoconical skirt 46 advantageously isolates the radially outermost part 40″ of the collection space 40 from the radially innermost part 40′ of the collection space 40, which is in contact with the outer filter wall 20 and is therefore exposed to the flow passing through this.

Because of the frustoconical skirt 46 and the unapertured cylindrical wall 47, this radially outermost part 40″ of the collection space 40 constitutes a calm area, or even a dead area, in the latter so that debris, detritus or foreign bodies reaching the collection space 40 naturally tend to collect there.

As previously, but in alternating sequence with the corresponding purging operations, the valves 52A, 52B controling the offtake conduits 41A, 41B to which are connected the component parts 40A, 40B of the collection space 40 are periodically opened for ten seconds or so, as previously described.

The resulting increase in the flowrate, diverted through the offtake conduits 41A, 41B without passing through the outer filter wall 20 of the screen 13, leads, as previously, by virtue of an increase in the tangential component of the speed vector and turbulence at the outer filter wall 20, to detachment of any debris, detritus or foreign bodies that the latter may have held back despite the entrainment process that normally occurs in contact with it.

It also results in a violent inrush of the flow present in the part 40″ of the collection space 40 where the debris, detritus or foreign bodies collected by the latter have accumulated.

Thus, as previously, all of the debris, detritus or foreign bodies concerned is taken off to the drainage system via the offtake conduits 41A, 41B.

Although executed in alternating sequence with each other to minimize the diverted flow and so to reduce disturbances affecting the downstream side of the diversion, the periodic purgings of the collection spaces 40 and 49 are preferably executed immediately one after the other, or at least in very rapid sequence, so that the outer filter wall 20 and the inner filter wall 22 are always in substantially the same condition and so both give rise to substantially the same head losses.

In practise the head losses increase only slightly between two purge cycles because virtually all of the debris, detritus or foreign bodies separated out by the outer filter wall 20 and the inner filter wall 22 are not retained by these walls but rather entrained along them to collect in the corresponding collection spaces 40 and 49.

The periodical purgings of the collection spaces 40 and 49 can therefore be widely spaced, by between one and a few hours, for example, which advantageously reduces the overall consumption of water.

As will be readily understood, the profiling of the inside surface of the transverse walls 14A, 14B of the filter body 12 is favorable to proper execution of such purging.

It is to be understood that the present invention is not limited to the embodiment described and shown, but encompasses any variant execution.

Specifically, the filter body of the filter in accordance with the invention may form an integral part of some other component of the installation concerned, for example the water box of a steam condenser.

It will have been noted that the two filter walls of the screen, which are coaxial, have oppositely directed conical tapers merging with each other at the upstream end, which is the larger diameter end of the outer filter wall and the smaller diameter end of the inner filter wall, the inner filter wall converging towards the associated collection space and the outer filter wall diverging towards its own collection space.

I claim:

1. Filter without moving parts comprising a filter body adapted to be mounted in a conduit along a flow direction of fluid to be filtered, a filter screen having a frustoconical outer filter wall having small and large diameter ends an inner filter wall being arranged inside said outer filter wall, said outer filter wall being supported at its large diameter end inside said filter body, said inner filter wall extending axially lengthwise from the small diameter end of said outer filter wall into said filter body, said filter screen extending into the conduit substantially upstream beyond said filter body, said filter body having means defining a first collection space and means defining a second collection space inside said filter body, at least one offtake conduit being connected to said means defining a first collection space, said means defining a second collection space bing disposed at the end of the inner filter wall axially remote from the small diameter end of the outer filter wall and including a back wall at said last mentioned end of said inner filter wall, a second offtake conduit separate from the first offtake conduit being connected to said means defining a second collection space, said second offtake conduit extending substantially radially through the filter body from said means defining a second collection space and traversing said outer filter wall.

2. Filter according to claim 1, wherein said inner filter wall of said filter screen is of substantially the same axial dimension as said outer filter wall.

3. Filter according to claim 1, wherein said inner filter wall of said filter screen is frustoconical.

4. Filter according to claim 3, wherein said inner filter wall and said outer filter wall of said filter screen have substantially the same cone angle.

5. Filter according to claim 3, wherein said inner filter wall and said outer filter wall of said filter screen each have panels which include an array of filaments parallel to a median axis of the panel and transverse support bars to which said filaments are attached.

6. Filter according to claim 1, wherein said inner filter wall and said outer filter wall of said filter screen are arranged to achieve substantially the same average flow rate per unit surface area.

7. Filter according to claim 1, comprising baffles extending radially outwards from said outer filter wall of said filter screen towards the surrounding conduit.

8. Filter according to claim 7, comprising baffles extending axially along at least part of the axial length of said inner filter wall of said filter screen from its smaller diameter end and by which an interior of said inner filter wall is subdivided into separate compartments and baffles extending axially along at least part of said filter screen from said larger diameter end of said outer filter wall and by which a space between said inner filter wall and said outer filter wall of said filter screen is subdivided into separate compartments, wherein all said baffles are parts of baffles extending radially away from and axially along at least part of the filter, and further comprising filter panels disposed between said baffles and forming said inner filter wall and said outer filter wall.

9. Filter according to claim 1, comprising baffles extending axially along at least part of an axial length of said filter screen from said larger diameter end of said outer filter wall and by which a space between said inner filter wall and said outer filter wall of said filter screen is subdivided into separate compartments.

10. Filter according to claim 1, wherein said filter body has axially spaced apart transverse walls and a frustoconical skirt disposed in said filter body around and spaced from said filter screen and extending axially fromt he tranverse wall of the filter body aixally nearest the small diameter end of said outer filter wall of said filter screen, said skirt subdividing said means defining a first collection space radially into two separate parts, one of said parts being radially spaced from the outer filter wall and defining a calm area in which debris is adapted to be collected.

11. Filter according to claim 10, wherein said frustoconical skirt extends axially substantially as far as the large diameter end of said outer filter wall and further comprising an unapertured cylindrical wall between said larger diameter end of said outer filter wall and the corresponding transverse wall of said filter body.

12. Filter according to claim 1, wherein said filter body has axially spaced apart transverse walls, the transverse walls of said filter body axially remote from said small diameter end of said outer filter wall of said filter screen have an inside surface with a U-shaped radial section.

13. Filter according to claim 12, wherein the transverse walls with a U-shaped radial section carry a synthetic material lining in the form of a gasket having a curved inside surface between the large diameter end of the outer filter wall and a peripheral wall of the filter body.

14. Filter according to claim 1, wherein said means defining a first collection space is circumferentially subdivided into two separate parts and further comprising a respective first offtake conduit connected to each of said two separate parts of said means defining a first collection space.

15. Filter according to claim 1, comprising axially extending baffles mounted inside an interior space defined by said inner filter wall and subdividing said interior space into compartments.

16. Filter according to claim 1, comprising axially extending baffles mounted inside a space defined between said inner and outer filter walls and subidividng said space into separate compartments.

17. Filter according to claim 1, comprising radially and axially extending baffles subdividing an interior space defined by said inner filter wall and also subdividing a space defined between said inner and outer filter walls, said baffles being fixed to the respective filter walls.

18. Filter according to claim 1, wherein the axial length of the filter body is approximately only slightly greater than or less than half a diameter of the conduit and an axial length of the screen is substantially equal to the diameter of the conduit.

19. Filter according to claim 18, wherein the surface area of said filter screen is at least five times the cross section area of the conduit.

* * * * *